July 4, 1939. W. SCHEPPMANN 2,164,947
COUPLING DEVICE
Filed July 9, 1938

Inventor:
Wilhelm Scheppmann
by R.C. Hopgood
Attorney

Patented July 4, 1939

2,164,947

UNITED STATES PATENT OFFICE 2,164,947

COUPLING DEVICE

Wilhelm Scheppmann, Berlin, Germany, assignor to C. Lorenz Aktiengesellschaft, Berlin-Tempelhof, Germany, a company Original application October 10, 1936, Serial No. 104,977. Divided and this application July 9, 1938, Serial No. 218,446. In Germany October 14, 1935

1 Claim. (Cl. 64—19)

This application is a division of application Serial No. 104,977, filed October 10, 1936.

The present invention relates to a coupling device of the type according to which each end of two shafts to be coupled with one another is provided with a disc, and in which said two discs are interconnected by means of a coupling rod. The object of the invention is to improve the bearing of the coupling rod in said two shafts terminating discs.

Arrangements in connection with the bearing of such coupling rods require an unrestricted relative motion between the various members without inadequate allowance and must be independent of extraneous influences, such as stresses which are set up either on account of temperature changes, during the mounting operation and even in cases of abrupt shocks. Moreover, the bearings themselves must be so designed that no utmost accuracy is necessary during the manufacturing process, specifically in cases of serial manufacturing which are generally required when coupling devices are concerned.

This problem is solved according to the present invention by forming the two ends of the coupling rod like balls and to arrange these ball-shaped ends in triangular apertures provided in the discs which are fixed at the ends of the shafts. Moreover, means are provided for maintaining the ball-shaped ends of the rod under adequate pressure in the appertaining triangular apertures.

Figures 1, 3:
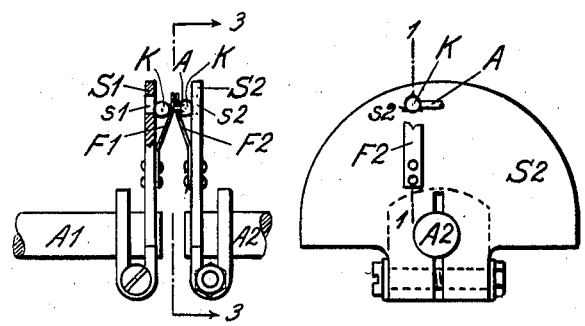
Figure 2:
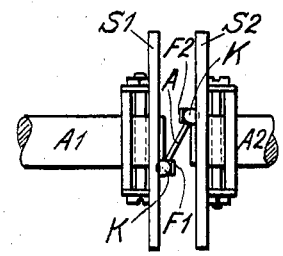

The invention will be more readily understood from the following description taken in conjunction with the accompanying drawing, in which:

Fig. 1 shows a partially sectioned side elevation of a coupling device to which the invention has been applied, Fig. 2 is a top view to Fig. 1, while Fig. 3 represents a section on the line 3—3 of Fig. 1, which latter in turn shows a section on the line 1—1 of Fig. 3.

In the drawing, the reference A indicates a coupling rod, the ends of which present globular shape in accordance with the invention. The object of this rod is to couple the two shafts A1 and A2 with one another. Each of these shafts A1 and A2 carries a disc member S1 and S2, respectively. The globular ends K of the rod are according to the invention seated in triangular apertures $s1$ and $s2$ of the discs S1 and S2, contradictory to the heretofore known arrangements of this type, in which circular apertures have been employed. The driving power transmission from the one to the other side of a coupling having bearings of circular shape is subjected to inaccuracies since the ball-shaped ends which are turned down in a lathe generally do not present exact globular shape. This disadvantage is avoided by means of the triangular shape of the apertures $s1$ and $s2$ since the coupling rod is restrained by merely three points of contact so that absolute accuracy of positioning in the sense of reproducibility of positioning is secured, while circular apertures upset relevant cooperation between such apertures and the ball-shaped member K. The springs E1 and F2 are adapted to maintain the globular heads K and thus the coupling rod A in correct position.

What is claimed is:

In a clutch the combination of two shafts arranged end to end, a disc on each of these shafts, a rod having globular ends, said discs having each a triangular aperture, and means to press the said globular ends each into one of these apertures so that the rod is mounted therein.

WILHELM SCHEPPMANN.